US006618734B1

United States Patent
Williams et al.

(10) Patent No.: US 6,618,734 B1
(45) Date of Patent: Sep. 9, 2003

(54) PRE-EMPLOYMENT SCREENING AND ASSESSMENT INTERVIEW PROCESS

(75) Inventors: Carl J. Williams, Charlotte, NC (US); Andrew Kenneth Kunda, Charlotte, NC (US); Edward J. Myers, Hewitt, NJ (US)

(73) Assignee: Spherion Assessment, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/619,979

(22) Filed: Jul. 20, 2000

(51) Int. Cl.[7] .............................................. G06F 17/30
(52) U.S. Cl. ...................................... 707/104; 707/102
(58) Field of Search .................................. 707/104, 101, 707/102, 10, 9, 8, 7, 6, 3, 1

(56) References Cited

U.S. PATENT DOCUMENTS

| | | | |
|---|---|---|---|
| 5,117,353 A | 5/1992 | Stipanovich et al. | |
| 5,321,610 A | 6/1994 | Breslin | |
| 5,365,425 A | 11/1994 | Torma et al. | |
| 5,489,213 A | 2/1996 | Makipaa | |
| 5,592,375 A | 1/1997 | Salmon et al. | |
| 5,655,118 A | 8/1997 | Heindel et al. | |
| 5,671,409 A | * 9/1997 | Fatseas et al. | 434/219 |
| 5,799,286 A | 8/1998 | Morgan et al. | |
| 5,832,497 A | 11/1998 | Taylor | |
| 5,884,270 A | 3/1999 | Walker et al. | |
| 5,926,794 A | 7/1999 | Fethe | |
| 5,978,767 A | 11/1999 | Chriest et al. | |
| 6,213,780 B1 | * 4/2001 | Ho et al. | 434/118 |
| 6,385,620 B1 | * 5/2002 | Kurzius et al. | 705/1 |

* cited by examiner

Primary Examiner—Sanjiv Shah
(74) Attorney, Agent, or Firm—David I. Roche; Baker & McKenzie (57) ABSTRACT

An interviewing method and system is disclosed for pre-employment screening and assessment. A job candidate accesses the system in response to published position opening. Preliminary background information is requested and collected, and the system determines whether the applicant qualifies to advance to the substantive stages of the interview process. If qualified, the system administers a bona fide occupational qualifier (BFOQ) interview. The applicant's responses to questions are monitored to determine alternate directions in which the interview may proceed. Upon completion of the BFOQ interview, candidates who satisfy criteria set by the client/employer proceed to a behavioral assessment interview. The candidate responds to customized and validated assessment questions. Again, responses and response times are monitored to determine alternate directions in which the interview may proceed. Those who best match criteria set by the client/employer are advised that they pre-qualify for a follow-up interview and are given instructions regarding a direct, follow-up interview conducted by the client/employer. Once the interview process is completed, the system will perform a validation process, comprising a content-oriented validity evaluation and a criterion-related validity evaluation. The validation process is used to determine the need to eliminate or modify the interview questions, as well as to set predetermined levels to eliminate candidates not achieving such levels during the interview process.

13 Claims, 7 Drawing Sheets

PRE-EMPLOYMENT SCREENING AND ASSESSMENT INTERVIEW PROCESS

FIELD OF THE INVENTION

The present invention generally relates to a process for conducting an employment search via any of a variety of media such as telephone, employment center PCs, CD Rom, or internet based interactive response platforms. More specifically, the invention is designed to obtain candidate information through these media and evaluate that information based on prerequisites established by the client, or employer. The present invention provides instantaneous evaluation and feedback to an applicant. The process also contains a validation procedure based on employment data collected and analyzed subsequent to use of the process. The present invention, or system, is designed to increase the effectiveness of a company's employment and recruiting efforts while dramatically reducing hiring costs.

BACKGROUND OF THE INVENTION

The process used for employment and recruiting has long been a manual format. Over the last five years, the use of technology has grown, but in a very fragmented way. Typically, companies who utilized assessment instruments chose a labor intensive approach that is often inconsistent, and if validated, is clinically based.

In the past, companies managed the employment search from the initial stage, publicizing the opening, through to the last stages, such as the final interview, and have processed candidates through large and overworked staffs. This has lead to elongated cycle times and unaffordable hiring costs. The present system negates both of these trends.

This traditional process inhibits a company from analyzing the effectiveness of employment metrics. When changes occur in the traditional process, such as labor law changes or position requirement changes, it creates disruption and reduces the effectiveness of hiring during the transition.

There have been some prior attempts at providing an effective system or process for conducting employment searches. One such attempt is disclosed in U.S. Pat. No. 5,884,270 issued to Walker et al. on Mar. 16, 1999. Walker et al. discloses a system for facilitating employment searches using anonymous communications including a plurality of party terminals, a plurality of requester terminals, and a central controller. Applicants can enter and store their background information into a database, which a prospective employer can access through search requests. The central controller releases applicant information according to the search request.

However, unlike the present invention, Walker et al. does not provide for instantaneous evaluation of that information based on an employer's criteria, or for programmed feedback to the applicant regarding the status of the application. Moreover, the Walker et al. process is accessible solely through a computer terminal, unlike the present system. Furthermore, unlike the present system, the Walker process does not contain a validation process, which is vital to the overall quality of the interview process and for the ability to conform with EEOC expectations.

Another prior attempt at providing an effective system or process for conducting employment searches is disclosed in U.S. Pat. No. 5,832,497 issued to Taylor on Nov. 3, 1998. Taylor discloses a computer system which manages the exchange of information through two databases. An object of the system is to allow applicants to enter background information in response to a database of job openings. The employer is then able to access the applicant information by entering a search request. Again, this system does not provide instantaneous evaluation and feedback to an applicant. Furthermore, an applicant must enter data via a computer terminal only. Lastly, the system does not contain a validation process to improve the overall quality of the system.

The present invention overcomes the problems and limitations of prior employment search methods and systems, and provides great advantages thereover. The present invention further advances the art of conducting an employment search, and the techniques for obtaining candidate information and evaluating that information, beyond which is known to date.

SUMMARY OF THE INVENTION

The present invention provides an automated interview and data collection system that is comprised of job-related questions. The system and process of the present invention automatically and objectively measures a job candidates work ethic, adaptability, teamwork, customer-service orientation, dependability, and other traits. It reduces the client's or employer's workload by providing instantaneous automated evaluation of candidate qualifications through interview questions customized for the client's or employer's needs, thus relieving the human resources department from time-consuming initial interviews. Furthermore, the present invention delivers better candidates while reducing the exposure to litigation due to illegal or biased questions, as the interviews are examined for these types of aberrations, or personal biases on the part of a human interviewer.

The system of the present invention captures all necessary and desired employment data of a prospective employee, and is accessible daily by the client/employer for evaluation according to that client/employer criteria. Furthermore, the present system and method accepts changes to a client's or employer's employment criteria and implements those changes overnight.

The present invention further incorporates a validation procedure assessing both content-oriented validity and criterion-related validity. Content-oriented validation determines the extent to which the interview content corresponds to job content. Criterion-related validation determines the extent to which a predictor score, obtained during the interview process, corresponds to subsequent job performance.

A goal of the invention is to collect candidate information. Data is collected by the system of the present invention via the use of various media including but not limited to Interactive Voice Response telephone technology, CD Rom, and Internet based interactive response platforms. In the first tier of the interview process, candidates are asked questions concerning employment eligibility and availability, job and educational requirements, work experience, work schedule, drug screening acceptance, etc. In the second tier, the system asks questions designed to assess whether a candidate displays critical, job-related behavioral characteristics. The assessment is based upon specifically measured dimensions identified by the client.

A second goal of the invention is to evaluate candidate information to determine which candidates best satisfy the client's prerequisites. In the first tier, candidates may be eliminated from further consideration depending on their responses to a specific question. If an applicant is not eliminated, the interview development process transitions into the second tier. There, the typical interview consists of numerous questions (for example 35 to 40) that allow the system to determine which applicants best match the criteria set by the client. The candidate's response to each question is measured along with response time in answering the question. Specific questions function as a trigger question. Inappropriate responses or response time triggers the system to branch and ask additional questions.

A further goal of the invention is to enhance the typical follow-up interview process. Once an initial interview through the system is completed, the system can immediately schedule a candidate for a follow-up interview, to be conducted by either the client/employer or the third-party interviewer at a set time and date. The system can also immediately transfer the candidate to a client/employer or third party interviewer. This feature reduces the labor and time typically expended in contacting applicants and increases the probability that an applicant will be present for a follow-up interview. The follow-up interview is conducted in person or by telephone and consists of open-ended follow-up questions that are developed by either the process or the client/employer. These questions are printed on the applicant's interview report generated by the system.

In addition, a goal of the process is to provide the client with candidate information. The client has the ability to access candidate information via internet based technology and/or through reports produced by the system and electronically sent to the client.

Another goal of the present invention is to administer interview questions that best exemplify the characteristics of the position. The present invention is able to provide this feature through a profiling process in which background information regarding the position, such as tasks performed and work environment, is obtained and entered into the system. The information is then analyzed to determine ideal characteristics for a position, including skills, abilities, and behavioral traits.

The profiling process begins with a panel of Subject Matter Experts who are consulted to understand which attributes are necessary to perform well in a given position.

A Subject Matter Expert is defined as a person who:
1) has been or is currently an incumbent in the position, or
2) has supervised incumbents holding the position, or
3) has trained incumbents for the position, or
4) has recruited applicants for the position.

Once interview questions are formulated based on the consultation, they are administered to individuals currently holding the position who are considered to be performing at a high level. The individuals are asked to determine the relative importance of tasks associated with the position. The client next examines the proposed list of questions. In addition, actual workplace observations are conducted and recorded. While at the workplace, documents used in the normal course of business maybe collected to provide greater insight into the characteristics of the position. Once all data from these steps is finally collected, a staff containing members with psychological training is implemented to create definitions and standards for various aspects of the position. When the definitions and standards are complete and approved by the client, the actual interview for candidates is then developed and entered into the system.

Still another goal of the invention is to provide validation for the process. The present invention incorporates a content-oriented evaluation. This evaluation is based on the job analysis data gathered in the interview development process. The interview questions are correlated to task statements described in the job description. This allows the content of the interview to correlate to the aspects of the position.

In addition, the present invention incorporates criterion-related evaluations based on concurrent validity and predictive validity. Concurrent validity involves the use in the system of a scoring algorithm for the client's interview created before administration to applicants. The system contains empirical data of the correlation between interview scores and job performance. The job performance data is provided by immediate supervisors, who are familiar with the employee's performance, through a performance evaluation configured to assess the identical dimensions measured in the interview. The implementation of a scoring algorithm allows the system to reduce the applicant pool based on interview scores not considered to be optimal.

Furthermore, an item analysis is conducted to determine the Internal Consistency Reliability Coefficient (alpha). This will identify interview questions, which must be modified or eliminated in order to improve the overall quality of the interview prior to administration.

The system also contains a statistical analysis of scores by appropriate race and gender groups to determine if the interview has an adverse impact or causes other equal employment opportunity discrepancies. To perform this analysis, the client must collect Equal Employment Opportunity data for applicants who complete the interview. At no time during the automated interview process will the process determine an applicant's age or religion. A candidate will be queried to provide race and sexual preference on a voluntary basis. This data is not provided to the client/employer on an individual basis.

Predictive validity involves the collection of performance data as well as a turnover and tenure analysis. The performance data has several forms. The evaluations completed by immediate supervisors, mentioned above, will be statistically correlated with interview responses to determine whether those responses are indicative of job performance. An additional form of performance data includes performance statistics, recorded by the client, which measure employee productivity. Productivity data will be correlated with interview responses in order to develop interview questions that will better ascertain those applicants having greater productivity. Again, an item analysis will be performed on the questions to identify questions which must be modified or eliminated from the interview process. The Internal Consistency Reliability Coefficient (alpha) will be calculated, providing an estimate of the average correlation among the items.

In the turnover and tenure analysis, the turnover rate for those employees hired through the present process is compared to the turnover rate for those employees hired by the traditional hiring methods. The tenure analysis will determine how the system can increase the probability that an applicant will sustain the position for an extended time period. This analysis will be conducted with the necessary data regarding turnover and tenure information provided by the client.

Lastly, there will be a utility analysis that will analyze the cost effectiveness and savings provided by the system. Specific information regarding average salary levels and G & A costs for the selected positions must be provided by the client, in order to perform this analysis.

Numerous other advantages and features of the invention will become readily apparent from the following detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing will be had by reference to the accompanying drawings wherein.

DETAILED DESCRIPTION OF THE PREFERRED EMBODIMENTS

While this invention is susceptible of embodiment in many different forms, there is shown in the drawings and will herein be described in detail a number of embodiments of the invention. The invention disclosed herein is equally applicable to many other prescreening employment embodiments or other embodiments besides the embodiments shown and described herein. It should be understood that the present disclosure is to be considered an exemplification of the principles of the invention and is not intended to limit the spirit and scope of the invention and/or the embodiments illustrated.

Figure 1:
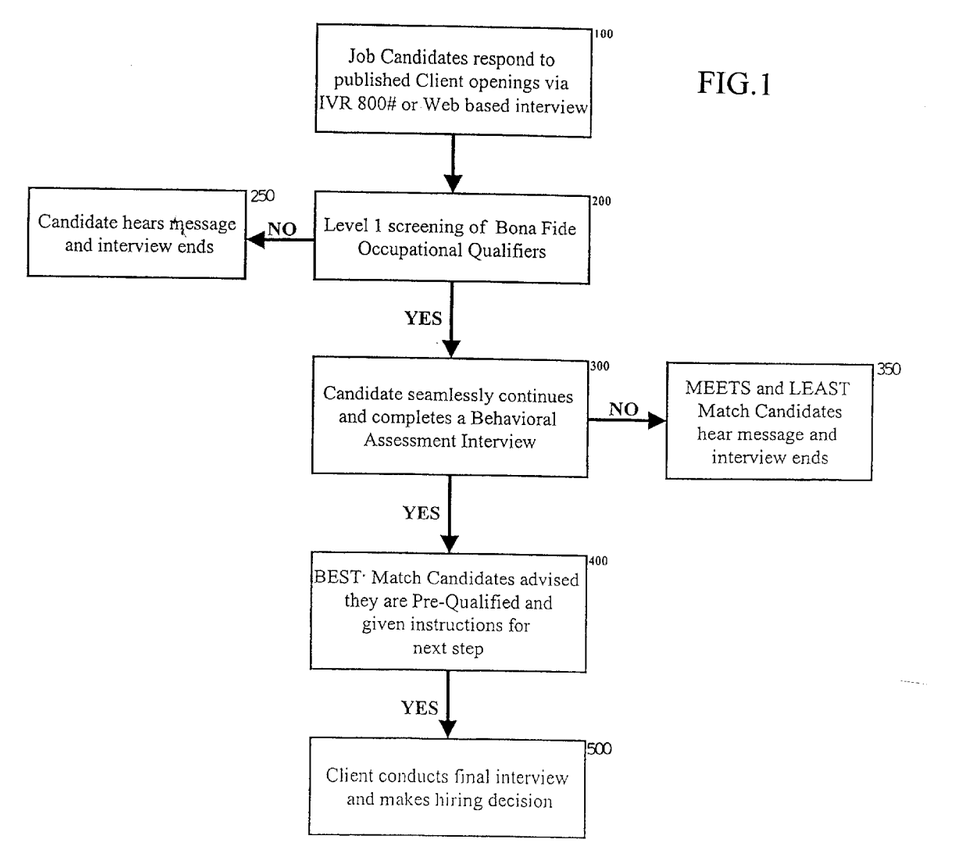
FIG. 1 is a flow chart diagram of the overall screening and assessment interview process of the present invention.

FIG. 1 provides an overview of the pre-employment screening and assessment interview process of the present invention. The process starts when an applicant accesses the system of the present invention via the Internet, telephone or other communication means, and responds to position openings which have been published by the client/employer and have been stored in the system (step 100).

Figure 4:
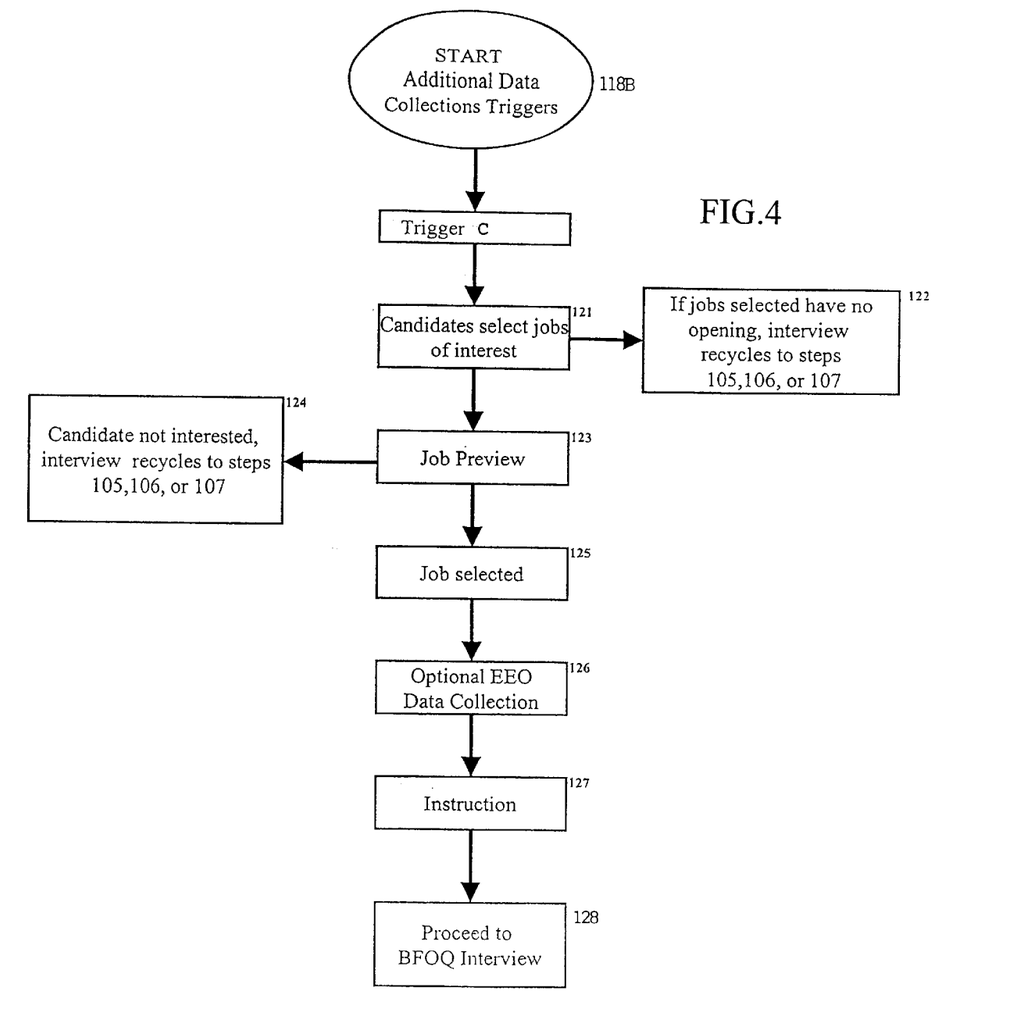
FIG. 4 is a flow chart diagram of the additional data collection process of the present invention.
Figure 5:
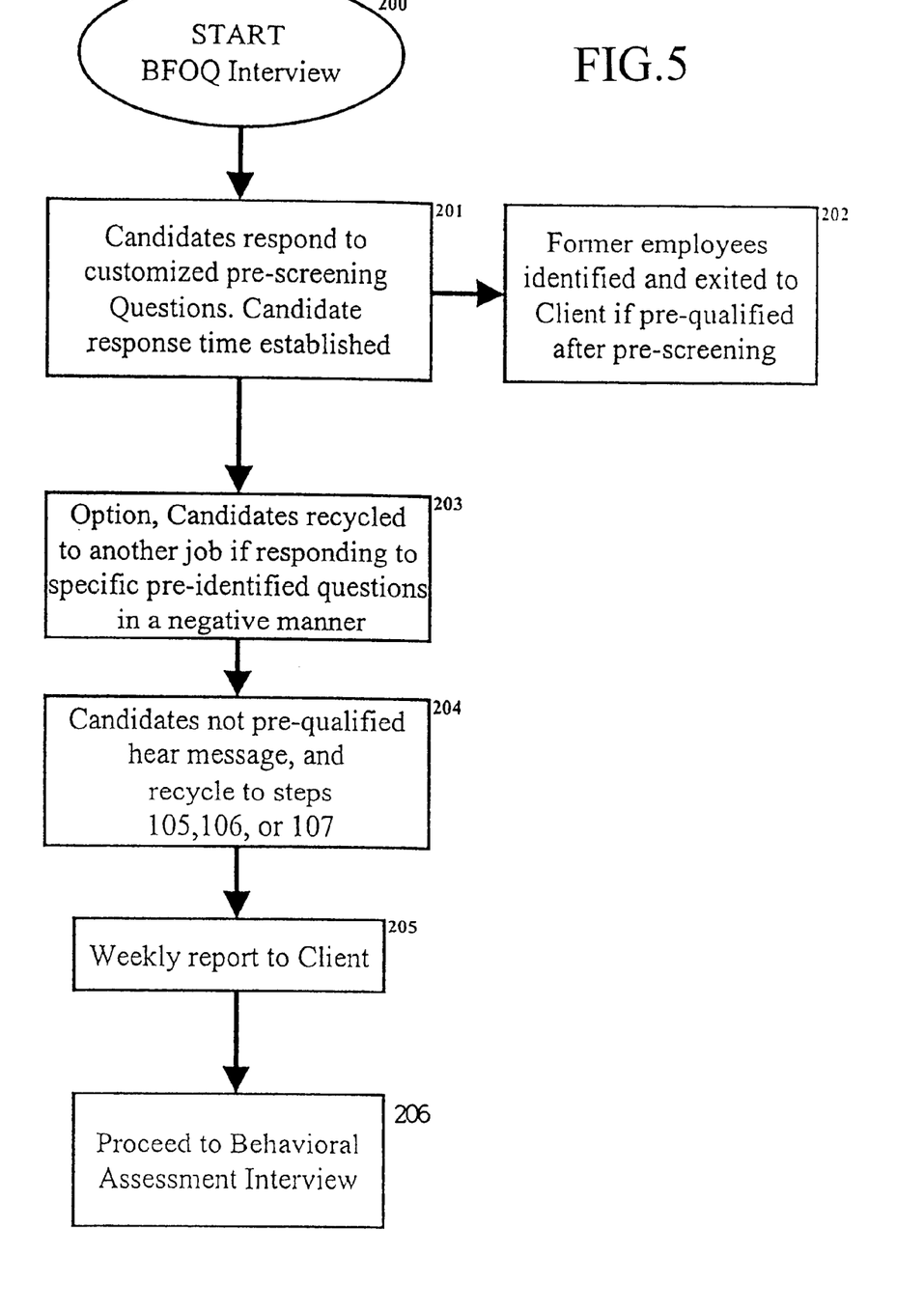
FIG. 5 is a flow chart diagram of the Bona Fide Occupational Qualifier (BFOQ) interview process of the present invention.

Once preliminary background information regarding the applicant is collected and the system determines that the applicant qualifies to advance to the substantive stages of the interview process (see FIGS. 2–4), the system administers a Bona Fide Occupational Qualifier ("BFOQ") interview (step 200) (see FIG. 5). At this stage, the applicant's responses to questions are monitored to determine alternate directions in which the interview may proceed. If a candidate does not satisfy the BFOQ interview, the candidate is exited from the interview and system (step 250).

Figure 6:
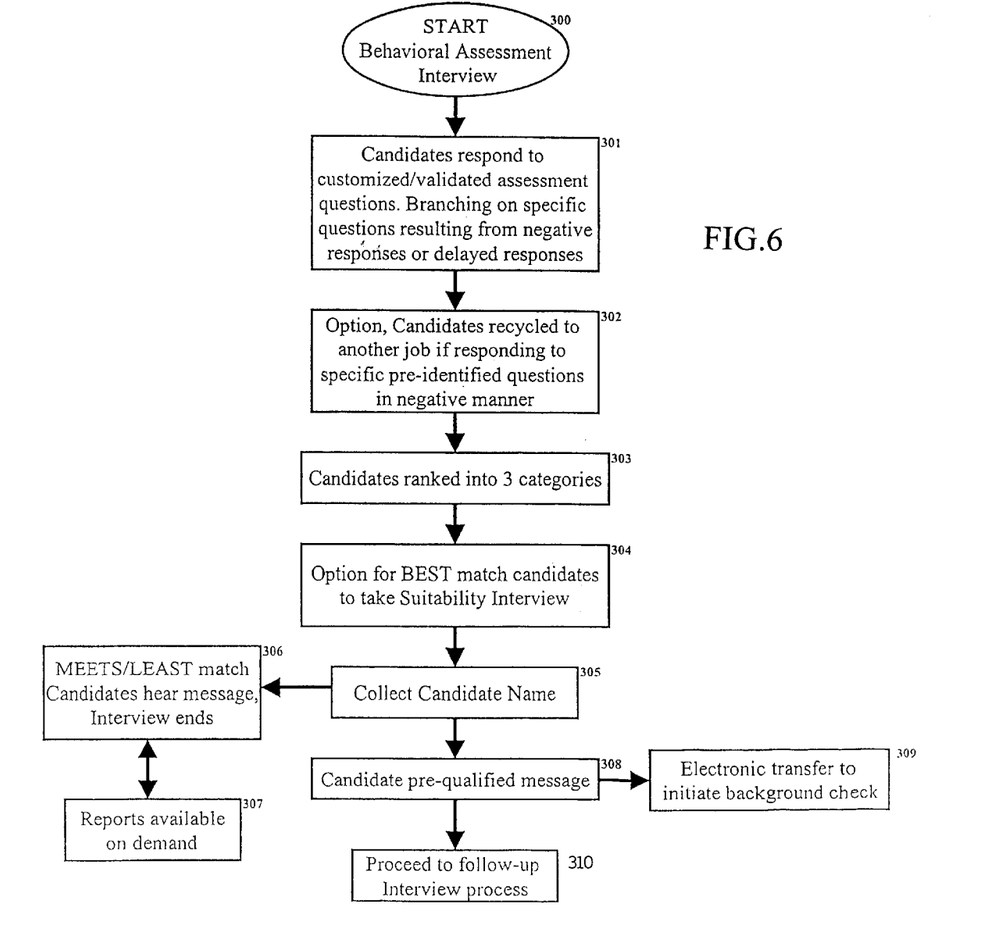
FIG. 6 is a flow chart diagram of the behavioral assessment interview process of the present invention.

Upon completion of the BFOQ interview (step 200), candidates who satisfy the criteria set by the client for this stage will proceed to the Behavioral Assessment Interview stage of the process (step 300) (see FIG. 6). At step 300, the candidate responds to customized and validated assessment questions. The applicant's responses and response times are monitored to determine alternate directions in which the interview may proceed.

Figure 7:
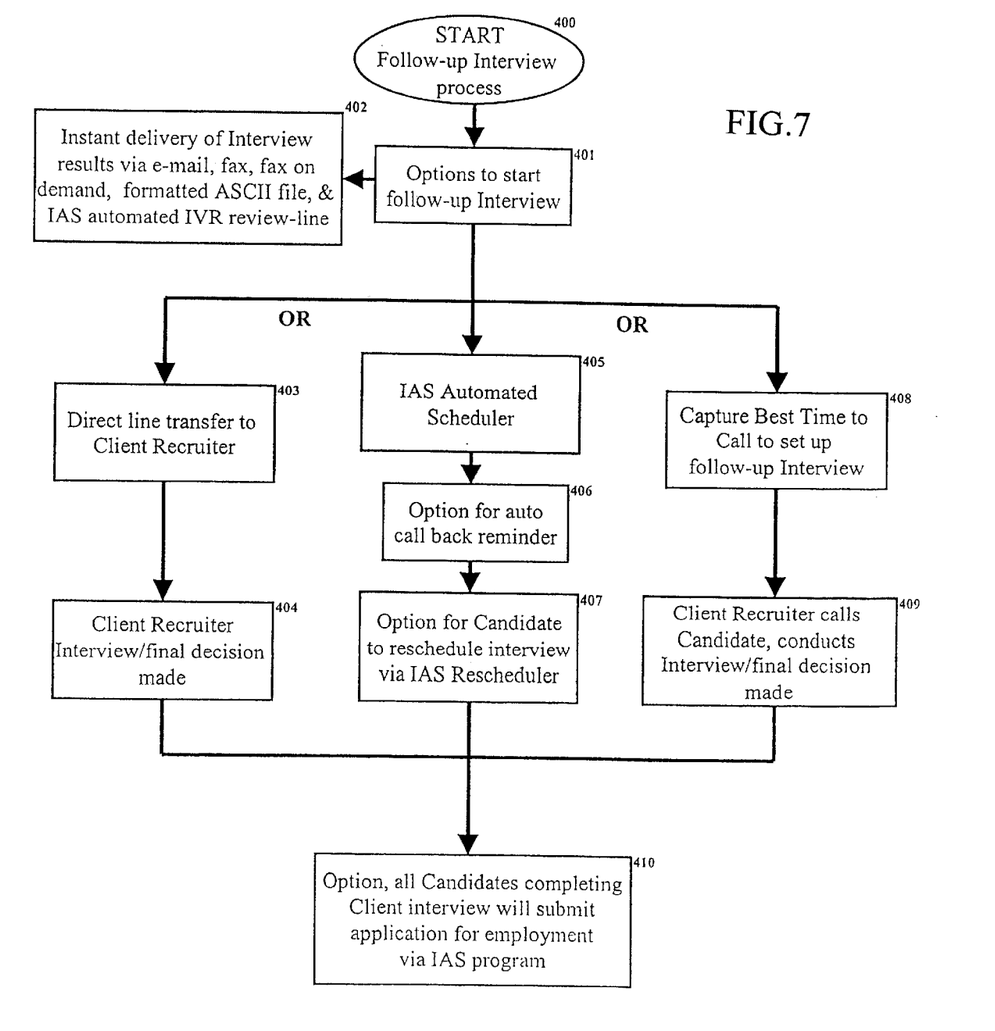
FIG. 7 is a flow chart diagram of the follow-up interview process of the present invention.

Those who "best" match the criteria set by the client for this stage are advised that they pre-qualify for a follow-up interview and are given instructions regarding the follow-up interview (step 400) (see FIG. 7). Those who are not considered a by the system to be best matches are exited from the interview and system (step 350).

In the final step 500, the client/employer conducts a direct interview with the candidate, either immediately following the Behavioral Assessment interview (step 300) or at a later scheduled time, and can then decide whether to offer the position to the candidate in person.

Without intending to limit the scope of the present invention, the individual steps of the system and method of the present invention will be described in more detail below, with respect to FIGS. 2–7.

Figure 2:
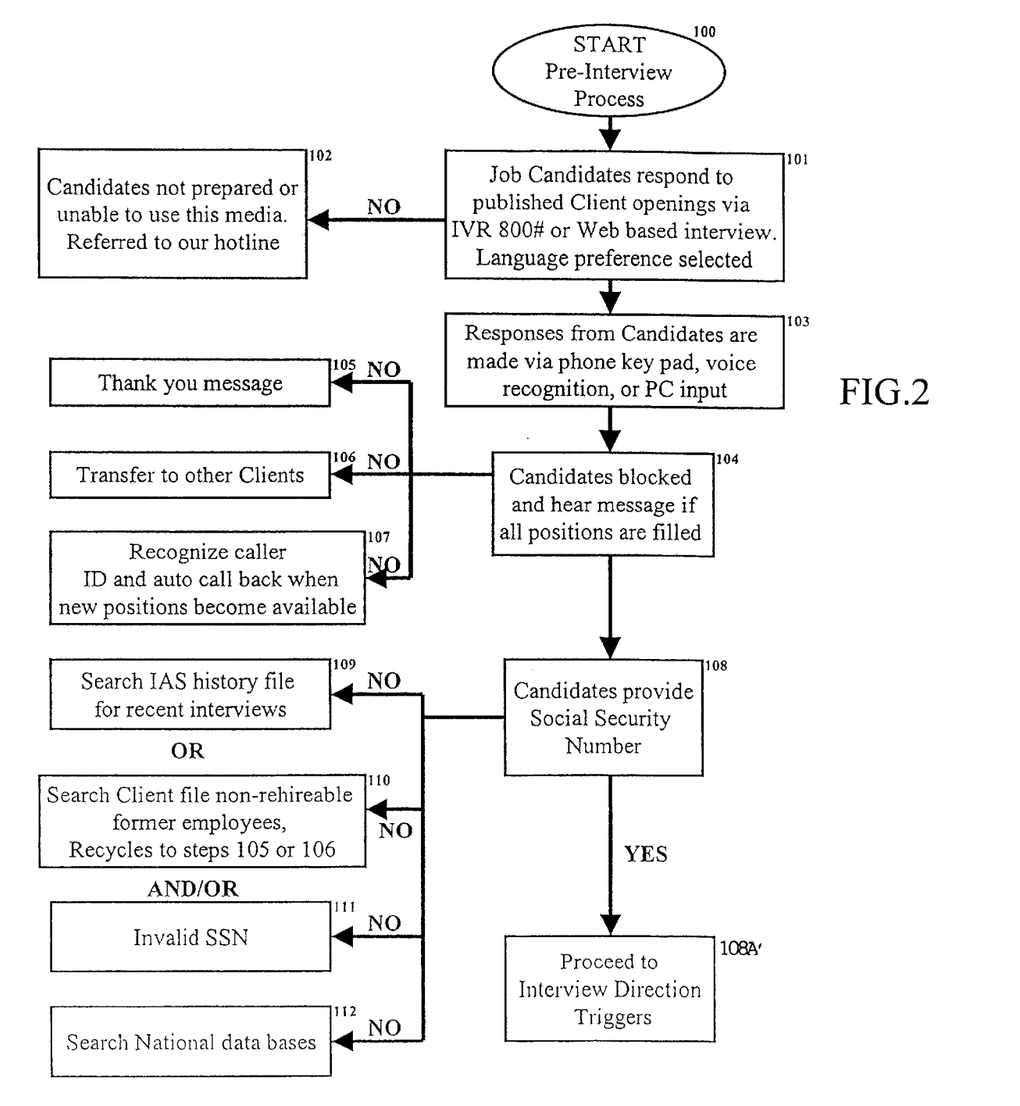
FIG. 2 is a flow chart diagram of the pre-interview process of the present invention.
Figure 3:
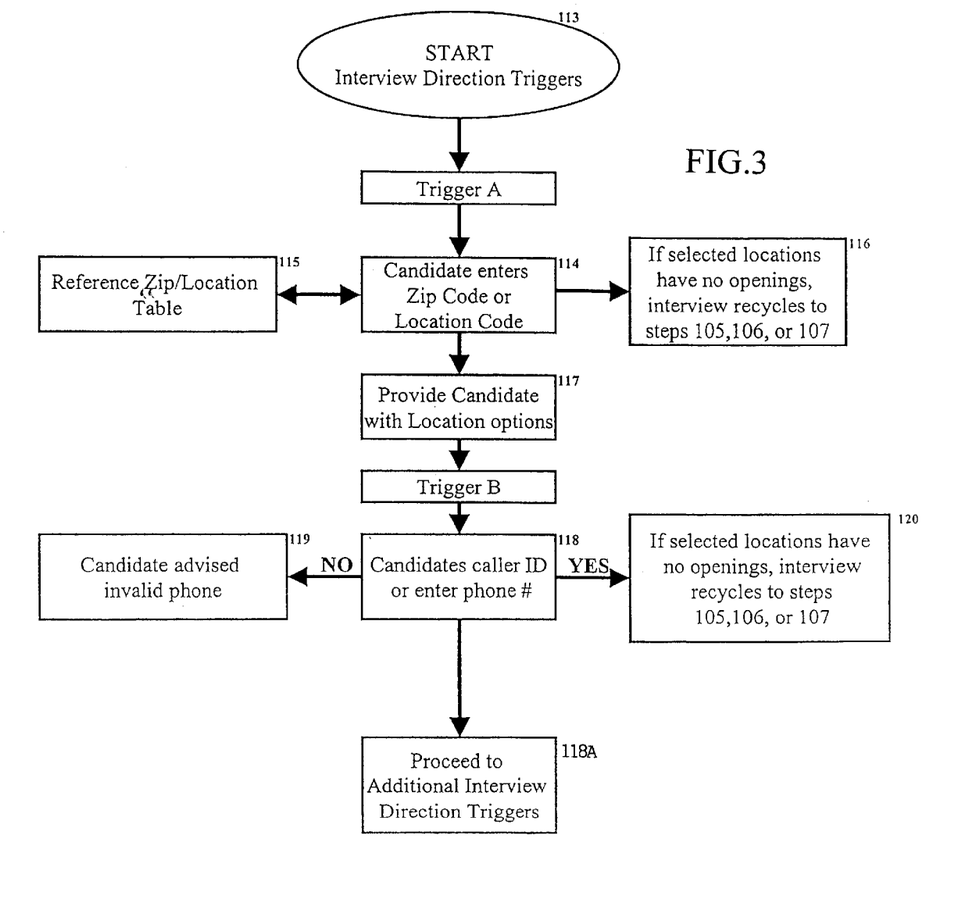
FIG. 3 is a flow chart diagram of the interview direction process of the present invention.

FIGS. 2–4 illustrate the initial step 100 wherein the system is accessed, the applicant provides preliminary background information, and the system determines whether the applicant will proceed to the BFOQ interview (step 200).

FIG. 2 illustrates the pre-interview process of step 100. A candidate responds by a suitable means of communication such a telephone, CD ROM, or an Internet-based platform, to a company's openings that have been publicized in venues such as classified ads, signage, or the Internet (step 101). Also at this time, candidates have the option of communicating in a language of their preference. If a candidate does not feel capable of using the present media, they are given a message to telephone or e-mail the provider's helpline for special handling (step 102).

Once communication between the candidate and the system has begun, certain applicant specific data is collected (step 103), determining the proper interview route. Candidates who do not meet the client's prerequisites are told to retry communicating at a time when they will be able to provide the necessary data. A client pre-determines the specific response mode to use whether by telephone keypad, voice recognition, or computer input. The Interactive Voice Response Technology platform offers two options for the candidate to respond to questions 103. The system then recognizes the candidate's response through either the pressing of keys or through verbal responses using key words.

The number of candidates authorized for entry to the interview is pre-determined based on empirical hire ratios 104. If all of the positions are currently filled, candidates are advised of this at step 10S. At this time, candidates can choose to be considered for similar positions with other clients/employers at step 106. If this option is selected, a different client/employer interview is conducted. Otherwise, if the candidate chooses to be contacted for future openings, the system saves the incoming telephone number into memory and utilizes an automated call back or e-mail procedure to contact the candidate at a later time (step 107).

Next, the candidate provides his or her Social Security Number (step 108), which is used to keep an account of that candidate's activities within the system. If the system detects a candidate who has attempted to re-apply before the requisite waiting period set by the client/employer has expired, they will be exited from the interview (step 109). During this phase of the process, a client/employer can compare candidates against a database of former employees that are not eligible for re-hire (step 110). Upon performing the comparison, non-rehireable candidates may be prompted to an exit from the interview portion of the process (step 105) or transferred to other clients/employers (step 106). If a candidate enters an incomplete or invalid (insufficient digits) social security number, he or she is prompted to re-enter the number (step 111). An incomplete or invalid entry on the second attempt terminates the session (step 105). During this phase, a client/employer may also compare a candidate's social security number against a national database (step 112). Once a valid social security number has been entered, the system proceeds to the interview direction process.

FIG. 3 illustrates the interview direction process of step 100, which starts at step 113. Here, the initial direction of the interview is determined by Trigger A. The candidate enters either the location code of a client/employer or submits his or her zip code (step 114) to allow the system's tables to determine the appropriate client/employer locations (step 115). If the selected locations have no open positions, the system recycles at step 116, to steps 105, 106, or 107 (FIG. 2).

Next, if the locations selected by either the candidate or the systems tables contain open positions, the candidate may choose one or all of the locations (step 117). A client at this point has the option to use caller ID or a telephone number that the candidate may have entered in order to determine client location (step 118). This determines whether the interview takes an alternate direction by Trigger B. If the candidate enters an invalid (insufficient digits or an unknown area code) or incomplete telephone number, he or she is prompted to re-enter the number (step 119). An invalid or incomplete entry terminates the session. If the selected locations contain no open positions, the system recycles the candidates at step 120, to step 105, 106, or 107.

If a valid phone number is entered or detected, the system then proceeds toward an additional interview direction process (step 118A), described in detail with respect to FIG. 4.

FIG. 4 illustrates the additional data collection process of step 100, which begins at step 118B. When the candidate begins this stage of the interview, if multiple skills are available, the candidate determines another interview direction at Trigger C, by selecting from those of interest (step 121). If all positions have been filled, the system recycles the candidate at step 122, to step 105, 106, or 107.

A description of the position the candidate has selected is presented at step 123. If after reviewing the description of the position, the candidate is no longer interested in any of the positions, the system recycles the candidate at step 124, to steps 105, 106, or 107. If a candidate after reviewing the description of the position is interested, the candidate proceeds to the next phase (step 125), where a job is selected. A voluntary set of questions, chosen by clients/employers who desire to collect EEO demographics, are offered (step 126). Instructions are provided concerning completion of the interview (step 127). The system then proceeds at step 128 to the Bona Fide Occupational Qualifier Interview (BFOQ) stage (step 200), describe in detail in FIG. 5.

FIG. 5 illustrates the BFOQ interview process. The purpose of the bona fide occupational qualifier assessment interview is to screen in candidates meeting the client's predetermined set of qualifications. Candidates answer a series of pre-screening questions varying in format (step 201). An average response time for the candidate is calculated and is also implemented in the Behavioral Assessment Interview at step 201.

Former employees of the client/employer who were not identified and exited during step 110 (FIG. 2) will now be identified. Former employees that successfully complete this interview will go to a separate exit and receive a separate set of instructions at step 202.

If the candidate is not suited for a particular position and the client/employer has multiple available positions, the candidate will be redirected to another position, depending on the response to a particular question (step 203). Candidates who do not pre-qualify for any position are recycled at step 204 to steps 105, 106 or 107 and exited from the interview. The client receives a weekly report or daily if required concerning those candidates who did not satisfy the pre-requisites of the position along with the results of the BFOQ interview at step 205. If a candidate pre-qualifies, i.e., passes the pre-screening questions, the system then proceeds at step 206 to the Behavioral Assessment Interview process of step 300.

FIG. 6 illustrates the Behavioral Assessment Interview ("BAI") process 300. The BAI is personalized for each client/employer based on the position. Candidates are notified that their responses to questions will be timed and monitored. After responding to questions, the average response time in the BFOQ phase is compared to the average response time in the BAI phase (step 301). If the response time is greater by a factor of 3, the system chooses an alternate questioning route (step 301). Delayed responses are not factored into the scoring. The system again uses this alternate questioning method when a candidate responds to integral questions with least preferred or negative responses (step 301). If it is determined from negative answers to specific pre-identified questions, that the candidate is not suited for a specific position, and the client has multiple available positions, the candidate may be redirected to another position at step 302.

Upon completion of the final question, the candidate is ranked and subsequent actions regarding the candidate are determined at step 303. The system then has the option of conducting a suitability evaluation of the Best Match candidates, which aids the client/employer in efficient placement of a candidate into a specific job classification (step 304). The first and last name of the candidate is obtained (step 305). Candidates who are not considered to be in the category of Best Match are notified that they will receive no further consideration for the position at the present time (step 306). Interview reports are provided if the client/employer seeks candidates other than those initially preferred (step 307).

Those candidates who are considered to be in the category of Best Match hear a message that they are pre-qualified candidates (step 308) and continue to the next phase of the process. If the client/employer requests or desires, candidate data is electronically transferred in order to perform a consumer report or background check (step 309). Results of the background check are sent directly to the client. The system then proceeds at step 310 to the follow-up interview process 400 for those candidates who pre-qualify.

FIG. 7 illustrates the follow-up interview process 400. This phase is designed to aid clients in obtaining final interviews directly with candidates along an efficient timeline. This phase begins with the selection of an option to set up a time for the follow-up interview (step 401), and the immediate delivery of interview results to the client/employer (step 402). Data can be transferred to the client/employer in a manner best accommodating a client's capabilities, for example by e-mail, fax, fax on demand, formatted ASCII file, automated IVR review line, or other suitable means.

The live interview can be done in a variety of formats. One of these formats is a direct line transfer to a client recruiter (step 403), upon completion of the previous stages of the interview. The follow-up interview is immediately conducted, and after completion, the client can make a contingent offer to the candidate if desired (step 404).

A second option for the follow-up interview is an automated scheduler, which schedules the follow-up interview for a mutually agreed time and day (step 405). Candidates who use the automated scheduler will receive an automated callback to remind them of their interview (step 406). A candidate may reschedule the interview by calling the automated scheduler line to make changes (step 407). This interview can be done in a variety of formats, such as: in person, telephone interview, teleconference interview, etc. After completion of the follow-up interview, the client can make a contingent offer if desired.

The third option for the follow-up interview is for the system to record the ideal time for the client/employer to call and conduct a subsequent interview (step 408). This interview can be done in a variety of formats, such as: in person, telephone interview, teleconference interview, etc. After contacting the candidate, and conducting the interview (step 409), the client/employer can make a contingent offer if desired. Candidates who have completed a live follow-up interview will complete an application for employment (step 410), via the system, which will be transferred to the client/employer's Human Resources Information System or department.

Once the above described interview process of the present invention is completed, the system will perform the validation process. The validation process comprises a content-oriented validity evaluation and a criterion-related validity evaluation.

The content-oriented validity evaluation is based on job analysis data gathered in the interview development process. The interview questions are correlated to task statements described in the job description. This allows the content of the interview to correlate to the aspects of the position.

The criterion-related validity evaluation is based on concurrent validity and predictive validity. Concurrent validity involves the use of a scoring algorithm for the client/employer's interview created before administration to applicants. The system contains empirical data of the correlation between interview scores and job performance. The job performance data is provided by immediate supervisors through performance evaluations configured to assess those dimensions measured in the interview. The scoring algorithm allows the system to reduce the applicant pool based on interview scores not considered to be optimal.

An item analysis will be conducted to determine the Internal Consistency Reliability Coefficient (alpha). This will identify interview questions, which must be modified or eliminated in order to improve the overall quality of the interview prior to administration.

A statistical analysis of scores by appropriate race and gender group determines if the interview has an adverse impact or causes other equal employment opportunity issues. The client/employer must collect Equal Employment Opportunity data for the first five hundred applicants who complete the interview.

Evaluations completed by immediate supervisors will be statistically correlated with interview responses to determine whether those responses are indicative of job performance (Predictive validity). In addition, performance statistics recorded by the client/employer measuring employee productivity may also be evaluated. Productivity data will be correlated with interview responses in order to develop interview questions that will result in greater productivity from those employees hired through the system. An item analysis will be performed on the questions to identify questions which must be modified or eliminated from the interview process. The Internal Consistency Reliability Coefficient (alpha) will be calculated, providing an estimate of the average correlation among the items.

Additionally, the system will provide a turnover and tenure analysis. The turnover rate for those employees hired through the system is compared to the turnover rate for those employees hired by traditional hiring methods. The tenure analysis will determine how the system can better ascertain applicants who will sustain positions for an extended time period. This analysis will be conducted with the necessary data regarding turnover and tenure information provided by the client/employer.

The system will also provide a utility analysis. The utility analysis analyzes the cost effectiveness and savings provided by the system. Specific information regarding average salary levels for the selected positions must be provided by the client/employer in order to perform this analysis.

Utility is measured as the dollar payoff to the organization resulting from the use of a particular procedure instead of selecting randomly, using the following formula:

$$\_U=(N)(T)(SD_y)(r_{xy})(Z)-(N)(C_y)$$

Where:
$\_U$=increase in average dollar-valued payoff
N=number of persons selected using the selection device
T=the expected tenure of the selected group
$Sd_y$=the standard deviation of dollar-valued job performance in the pre-screened applicant group
$r_{xy}$=the correlation of the selection procedure with job performance
$Z_x$=the average standard predictor score of the selected group
$C_y$=the cost of testing one applicant By way of example only, the following is a brief example of the present system and process in use. An employer posts an advertisement for a job opening, for example in a newspaper. The advertisement instructs candidates to access the system via suitable means, for example via a toll-free telephone number accessible 24 hours a day, seven days a week. Using a touch-tone phone, the candidate answers a two-tiered series of questions, for example, by pressing "one" to answer YES or "two" to answer NO.

The first tier asks the candidate questions for example regarding experience and availability. If the candidate satisfies the employer's eligibility standards, they continue to the second tier of questions.

The second tier of questions are custom designed to seek out candidates that best match, for example, the employer's culture and the characteristics necessary to perform in a productive manner, such as for example, questions relating to cooperation, customer service orientation, dependability, and ability to handle work demands. The responses and response times are monitored, with subsets of questions asked depending on the responses and response times to specific questions. Best matched candidates are then automatically scheduled for a follow-up interview.

It should be understood that the embodiments herein described are merely illustrative of the principles of the present invention. Various modifications may be made by those skilled in the art without departing from the spirit or scope of the claims which follow.

What is claimed is:

1. An interviewing system comprising:
an interactive response platform for pre-employment screening and assessment;

means in said interactive response platform for administering a first tier of questions and for determining qualification for advancement; and means in said interactive response platform for administering a second tier of questions and for determining qualification for advancement, said means for administering said first tier of questions and said means for administering said second tier of questions each include means for triggering the direction of interview questions by selectively asking subset questions responsive to said subroutine for triggering and wherein said means for triggering monitors responses and response times and determines the direction of interview questions based on said responses and said response times.

2. The interviewing system of claim 1, wherein:

said first tier of questions relate to a bona fide occupational qualifier interview.

3. The interviewing system of claim 1, wherein:

said second tier of questions relate to a behavioral assessment interview.

4. The interviewing system of claim 1, further comprising means in said interactive response platform for performing a validation process.

5. The interviewing system of claim 4, wherein:

said means for performing a validation process determines the need to eliminate or modify interview questions.

6. The interviewing system of claim 4, wherein:

said means for performing a validation process sets predetermined qualification levels for advancement.

7. An interviewing system comprising:

an interactive response platform for pre-employment screening and assessment;

said interactive response platform being capable of administering a first tier of questions and for determining qualification for advancement; and said interactive response platform being capable of administering a second tier of questions and for determining qualification for advancement, wherein said algorithm for administering said first tier of questions and being capable of administering said second tier of questions each include a subroutine for triggering the direction of interview questions by selectively asking subset questions responsive to said subroutine for triggering, wherein said subroutine monitors responses and response times and determines for direction of interview questions based on said responses and said response times.

8. The interviewing system of claim 7, wherein:

said first tier of questions relate to a bona fide occupational qualifier interview.

9. The interviewing system of claim 7, wherein:

said second tier of questions relate to a behavioral assessment interview.

10. The interviewing system of claim 7, further comprising an algorithm in said interactive response platform for performing a validation process.

11. The interviewing system of claim 7, wherein:

said system being capable of performing a validation process to determine the need to eliminate or modify interview questions.

12. The interviewing system of claim 11, wherein:

said system being capable of performing a validation process that determines the need to eliminate or modify interview questions.

13. The interviewing system of claim 11, wherein:

said system being capable of performing a validation process that sets predetermined qualification levels for advancement.

\* \* \* \* \*